(12) United States Patent
Romatier et al.

(10) Patent No.: US 6,299,845 B1
(45) Date of Patent: *Oct. 9, 2001

(54) CATALYTIC DISTILLATION WITH IN SITU CATALYST REPLACEMENT

(75) Inventors: Jacques J. L. Romatier, Riverwoods; Peter R. Pujado, Kildeer, both of IL (US)

(73) Assignee: UOP LLC, Des Plaines, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/907,728

(22) Filed: Aug. 8, 1997

(51) Int. Cl.[7] ........................................ B01J 8/02
(52) U.S. Cl. ..................... 422/211; 422/191; 422/193; 261/112.2
(58) Field of Search ..................... 422/196, 191, 422/190, 193, 195, 197, 211, 222, 180; 261/112.2, DIG. 72

(56) References Cited

U.S. PATENT DOCUMENTS

| | | | |
|---|---|---|---|
| 5,073,236 | 12/1991 | Gelbein et al. | 203/29 |
| 5,417,938 | 5/1995 | Shelden et al. | 422/196 |
| 5,470,542 | 11/1995 | Stringaro | 422/211 |
| 5,525,311 | * 6/1996 | Girod et al. | 422/200 |
| 5,626,051 | 5/1997 | Sabin | 72/379.6 |
| B1 4,296,050 | 4/1996 | Meier | 261/112.2 |

FOREIGN PATENT DOCUMENTS 2718985   4/1994  (FR) .

* cited by examiner

*Primary Examiner*—Hien Tran
(74) *Attorney, Agent, or Firm*—John G. Tolomei; James C. Paschall (57) ABSTRACT

A catalytic distillation packing that has continuous smooth channels over its entire length is used to change out catalyst in a catalyst distillation arrangement without replacement of packing units and long turnaround times. The long, continuous channels are formed from perforated, corrugated plates that have a sufficient thickness to maintain the geometry of the channels and permit free catalyst flow for catalyst change out. The thickness of the plates also eliminates the need for complicated bracing and attachment arrangements that adds to the expense of the packing arrangement and can obstruct the movement of catalyst therethrough. The long, continuous channels are used with an inlet arrangement that provides ready adjustment of the number of channels that are filled with catalyst and channels that are free of catalyst. It is also possible in this arrangement to operate with a channel arrangement wherein all channels are filled with catalyst.

16 Claims, 7 Drawing Sheets

CATALYTIC DISTILLATION WITH IN SITU CATALYST REPLACEMENT

FIELD OF THE INVENTION

This invention relates to equipment for the catalytic distillation processes.

BACKGROUND OF THE INVENTION

The use of catalyst in distillation columns to perform simultaneous distillation and catalytic reactions in a single contacting section or the dual functions of distillation and catalytic reaction in different sections of a common column are well known. To improve contacting and lower pressure drops it has been preferred to incorporate the catalytic material into a structured packing material. The structured packing material serves to increase vapor liquid contacting while lowering the pressure drop of vapor through the packed material. Structured packing material may also be useful to prevent flooding of the packed column section containing the catalyst so that true catalytic distillation may occur if desired.

Structured packing in the form of perforated plates sections has been found particularly desirable for use within catalytic distillation zones. The permeable sheets of material are typically formed from thin plates or screens. A shape in the form of corrugations is preferred. The corrugations aid in the dispersion of vapor and also add surface for contacting between vapor and liquid. Plate or screen sections are typically used to facilitate the forming process. Forming techniques have generally limited either the size or thickness of the corrugated packing elements made from plates. Large plates must use easily deformable material such as thin foil-like sheets. The thin plate materials have insufficient strength to support catalyst and maintain flow channels through the packing material. More structurally stable material such as thicker plate elements can only be formed in relatively small sections having width and height dimensions of less than 1 meter. While thinner plate sections can be made to maintain required channel dimensions, the thinner plates must be modified to add additional structural strength by techniques such as joining the corrugations at their contact points. However, such techniques are expensive and greatly complicate the manufacture of the packing elements.

The need to use plate elements having relatively small lateral dimensions as a packing material interferes with the long term usefulness of catalytic distillation arrangements. Effective catalytic distillation zones require at least several meters of height to have adequate reaction time and sufficient stages of separation. It's relatively common to have structured packing sections that contain catalyst with heights of about 9–11 meters and, depending on the diameter of the column, containing more that 1000 ft$^3$ of catalytic structured packing volume.

With the constrained dimension of the corrugated plate or screened elements, multiple layers of such elements are routinely stacked into the catalytic distillation section of a distillation column. Loading of multiple elements is time consuming. The structured packing units containing catalyst ordinarily have a roughly cube shaped geometry with sides of 12 to 18 inches in length and therefore can occupy as little as 1 cubic foot of distillation volume. Accordingly, for an average size reactive distillation arrangement, there could be more than 1000 of such cubes with many smaller cubes shaped to accommodate the curvature of the usual round column walls.

The stacking of multiple elements also occludes the openings of the channels provided between the corrugations which prevents catalyst from being loaded into the packing once it is in place in the column. Therefore, catalyst is preloaded into the packing modules before their installation into the distillation column. These modules typically retain the catalyst in a sealed envelope between the corrugations. In such arrangements it is not possible to replace catalyst without removing the packing units from the distillation column. Removal and installation of the packing units from the distillation column makes catalyst change-out and catalyst replacement a time consuming operation and an expensive part of continued catalytic distillation operation within the column.

The use of sealed catalyst envelopes has other disadvantages. For example, the number of channels that contain catalyst and are free of catalyst cannot be changed other than by a complete removal, replacement, and reloading of packing material from the column.

DESCRIPTION OF THE PRIOR ART

U.S. Pat. No. 5,470,542 discloses a catalytic distillation, packing material comprised of profiled walls in the form of corrugations having sealed ends at the top and bottom of alternate channels for retaining a particular catalyst. The walls are permeable and contact points between corrugations are joined in central sections of the channel to provide additional structural strength.

U.S. Pat. No. 5,073,236 discloses a structure for catalytic distillation having permeable wall members formed into corrugated shapes and alternate sealed channels that retain catalyst. The structure is incorporated into relatively short catalytic distillation modules with alternate vertical layers stacked so that the vertically adjacent channels extend perpendicularly.

U.S. Pat. No. 5,417,938 discloses a structure for catalytic distillation having vapor permeable, but catalyst impermeable wall elements that provide envelopes for retaining catalyst particles that are located between alternate horizontal layers of corrugated wall elements. The envelopes are completely closed and retain the catalyst in a sealed arrangement. Multiple layers of such envelopes are shown in a stacked arrangement.

U.S. Pat. No. 4,296,050 discloses a packing element made up of a plurality of corrugated plates having a plurality of apertures therein and packed in alternate layers having the walls perpendicularly disposed with respect to each other between layers. The use of catalyst with the packing is not taught.

French patent 2718985-A1 discloses a method for the explosion forming of corrugated plates having perforations therein. The method is useful in forming long corrugated plates of relatively heavy thickness.

SUMMARY OF THE INVENTION

It is an object of this invention to provide a packing material constructed of corrugated walls that provides a rigid structure over an extended height.

It is another object of this invention to provide a packing material and column for catalytic distillation in which the catalyst material is easily replaced.

It is a further object of this invention to provide a catalytic distillation packing and distillation column arrangement that permits the replacement of catalyst without removal of packing material from the distillation column.

It is a further object of this invention to provide a catalytic distillation packing and distillation column in which a configuration of catalyst-containing and catalyst-free channels is readily varied.

This invention is a packing material for catalytic distillation that uses corrugated walls to define channels for retaining catalyst and maintains continuous channels from the top to the bottom of the packing material so that catalyst is readily removed from the bottom of the channels. Catalyst may be removed from the channels to replace spent or inactive catalyst with fresh catalyst while the packing material is still located in the distillation column thus requiring only a fraction of the time normally required to replace catalyst. In addition, the ability to remove catalyst provides an added degree of flexibility in loading catalyst into the packing arrangement. For example, from one loading to the next, catalyst may be changed from a loading that places catalyst in alternate channels to a loading that places catalyst in every third channel. Thus the degree of distillation and catalyst reaction can be altered without a complete removal and replacement of the packing material.

Accordingly, in one embodiment this invention is a catalytic distillation column containing a structured packing. The structured packing comprises a plurality of corrugated plates having perforations defined therein and placed parallel to each other. The packing defines a vapor outlet at its top and a liquid outlet at its bottom. The spaces between the corrugations define a plurality of channels that extend continuously from the vapor outlet to the liquid outlet. Means are provided for releasing and retaining catalyst at the bottom of the channels. The column also contains means for collecting vapor from the vapor outlet and collecting liquid from the liquid outlet.

In a further extension of the distillation column embodiment described above, the column may contain an additional section of packing that comprises a plurality of the corrugated plates. The corrugated plates are similar in construction to the first described set, but are located above the first described packing section and do not contain catalyst. This additional packing section can thereby provide a desired number of pure distillation stages. Additional packing sections for distillation alone may also be added below the catalytic distillation section.

In another embodiment, this invention is a structured packing that comprises a plurality of corrugated plates having perforations defined therein and placed parallel to each other. The packing defines a vapor outlet at its top and a liquid outlet at its bottom. The spaces between the corrugations define a plurality of channels that extend continuously from the vapor outlet to the liquid outlet over the height of the corrugated plates. A particulate catalyst material is located in a first portion of the channels. A catalyst impermeable member located at the top of a second portion of the channels occludes the opening to the second portion of the channels and prevents particulate catalyst from entering therein.

The packing arrangement introduces flexibility into the loading arrangement for catalyst in the column. By using the packing of this invention a distillation column is easily adjusted to vary the amount of distillation versus the amount of catalytic reaction. Catalyst can be unloaded and a greater or fewer number of channels can be loaded with catalyst. In addition, the packing arrangement of this invention—unlike those described in the prior art—permits a total filling of all channels between the plates with a particulate catalyst material.

In addition the packing arrangement of this invention facilitates the addition of the entire catalytic distillation section for a catalytic distillation column at one time as a single cartridge. The cartridge can be loaded through a flange at the top of a column in a simple, single step loading operation. The cartridge can be loaded with catalyst in it or catalyst can be easily added by top loading the cartridge once it is in place in the column.

Another advantageous use of the packing of this invention is to change catalyst without a shutdown of a catalytic distillation column. Catalytic distillation columns typically operate at low pressure drop through the packing sections. Accordingly, continuous catalyst addition and withdrawal apparatus can be fitted into the column to provide continuous or semi-continuous catalyst addition and withdrawal during operation of the catalytic distillation column.

Additional advantages, details and embodiments of this invention are described hereafter.

DETAILED DESCRIPTION OF THE INVENTION

The packing of this invention is made of corrugated plates of substantial length and having sufficient structural strength to maintain the configuration of the channels without excessive deformation. The configuration of the channels must be maintained to allow free movement of catalyst through the packing during initial loading, withdrawal, and replacement of catalyst. Sufficient structural strength is added by using plates having sufficient thickness. The plates will usually need a minimum thickness of 0.8 millimeter. Ordinary plate forming methods usually do not have the capability to provide plates of the desired length for the practice of this invention with minimum thicknesses of 0.8 millimeter. The thickness of the plates will usually range between 0.8 millimeter–1.5 millimeters.

Accordingly the basic element of this invention is structured packing containing continuous corrugated plates that have lengths of at least 1 meter and, more typically, 5–12 meters. The length of the plates is determined by the desired overall length of the catalytic distillation section. It is essential to achieving the catalyst movement of this invention that the plates be continuous and provide a smooth surface over which catalyst can slide freely as it drops through channels formed by the distillation plates. The corrugations of the distillation plates have the function of promoting mixing of the vapor and liquids while also increasing the wetted surface area for mass transfer through the packing section. In addition, as well known in the art, the perforations are provided to further enhance the mass transfer characteristics of the plates by increasing surface area and connecting adjoining channels.

Figure 1:
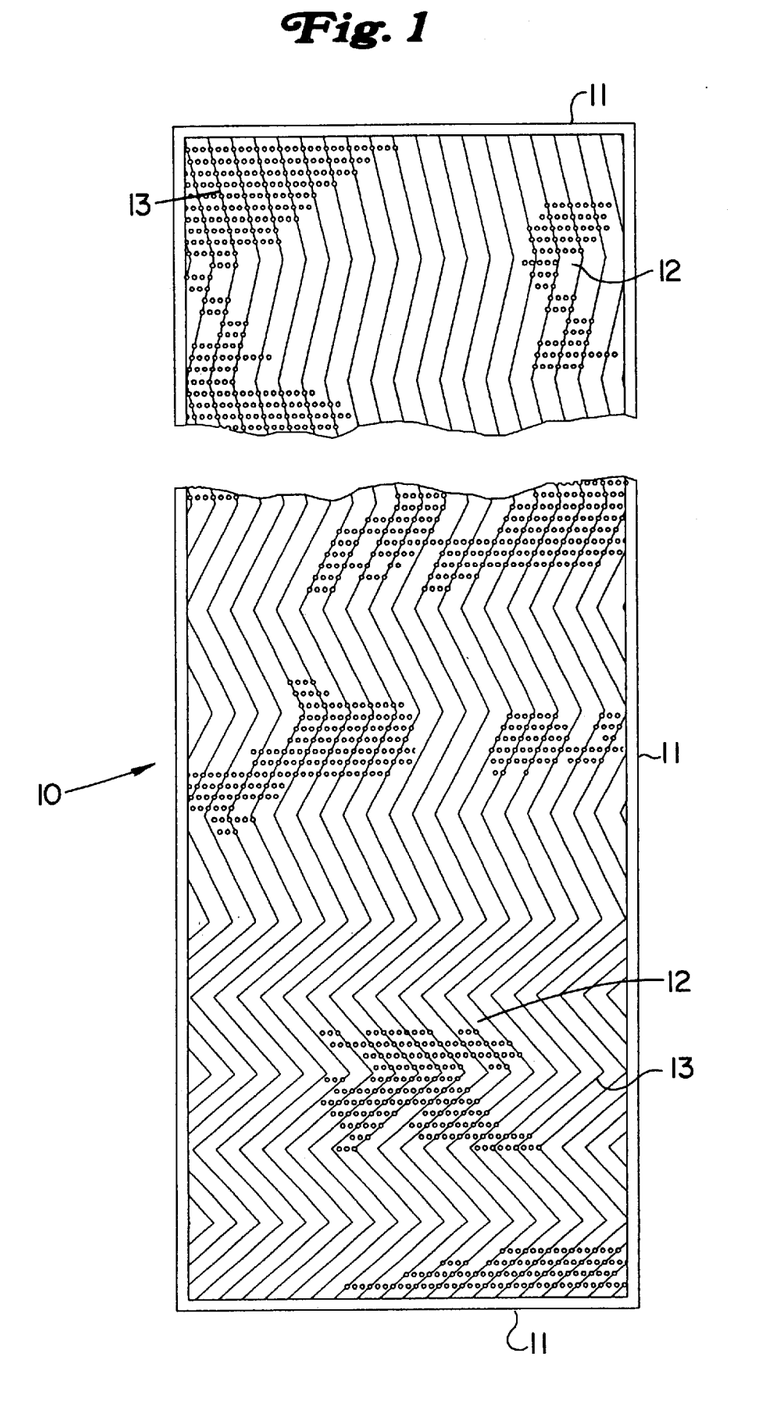
FIG. 1 is a plan view of a plate that forms the packing of this invention.

FIG. 1 shows a typical plate element used for the packing of this invention. Reference numeral 10 indicates corrugated plates 10 having apertures or perforations and corrugations formed continuously over the entire length of the plate. The plates may be formed with corrugations having a constant pitch angle or the pitch angle may be varied over the length of the plate to vary the turbulence and mixing of fluids over the height of the packing. The corrugation pitch angles can be in a range anywhere from greater than 0° to less than 90°. Typically, the corrugations have a pitch angle in a range of 10°–80° and, more typically, in a range of 15°–60°. In particularly preferred arrangements, the corrugations will have a pitch angle of 30°–35°. Preferably, each plate 10 will also contain smooth, non-corrugated edges 11 that facilitate the assembly of multiple plates into channels and the flow of fluids or catalyst into the channels.

The plates are also provided with perforations. The size, shape and pitch of the perforations are susceptible to considerable variation. The size of the perforations while not restricted to such sizes can typically vary in diameter from 0.02 to 0.13 in. The selection of the perforation size will depend on the function of the perforations. If the perforations serve mainly for mass transfer purposes, there is no particular limitation on the perforations—apart from not interfering with the overall strength of the plates. Thus, the perforations may have a larger diameter than the particles located therein. Where the packing arrangement alternates between catalyst filled channels and catalyst empty channels, holes must be sized to retain catalyst in selected channels. It is also possible to have plates sections that isolate fluids, such as a heat transfer fluid, and contain no perforations at all.

The selection of a material for the plates from which the corrugations are formed is again dictated by structural considerations and any material having sufficient strength to maintain the dimensions of the channels can be used. The plates are typically composed of ferrous or nonferrous alloys such as stainless steels. Long continuous, corrugated plates having perforations and the desired structural strength to maintain channel dimensions can be formed by an explosion forming technique as described in U.S. Pat. No. 5,626,051; the contents of which are hereby incorporated by reference.

Figure 2:
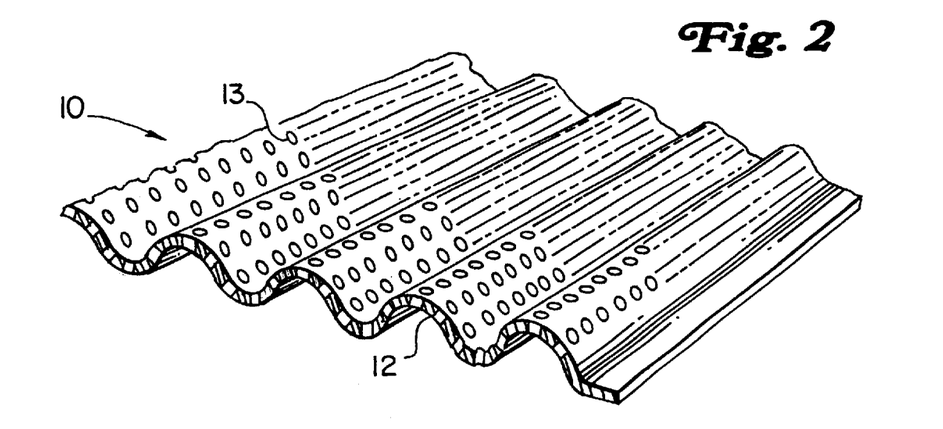
FIG. 2 is a perspective view of a section of plate that forms the packing of this invention.

FIG. 2 shows a cross-section of a typical corrugated plate taken across the corrugations. FIG. 2 shows corrugated plate 10 with apertures 13 and corrugations 12. The corrugations are depicted with a generally sinusoidal shape, but they may be provided with any geometry that provides peaks and valleys for creating alternating channels along the corrugated plates. The spacing of the corrugations will usually be in a range of 1–2 inches and the depth of the corrugations between adjacent peaks and valleys will usually be in a range of 0.2 in. to 1 in. so that the channels have a minimum width of 0.4 to 2 inches.

Figure 3:
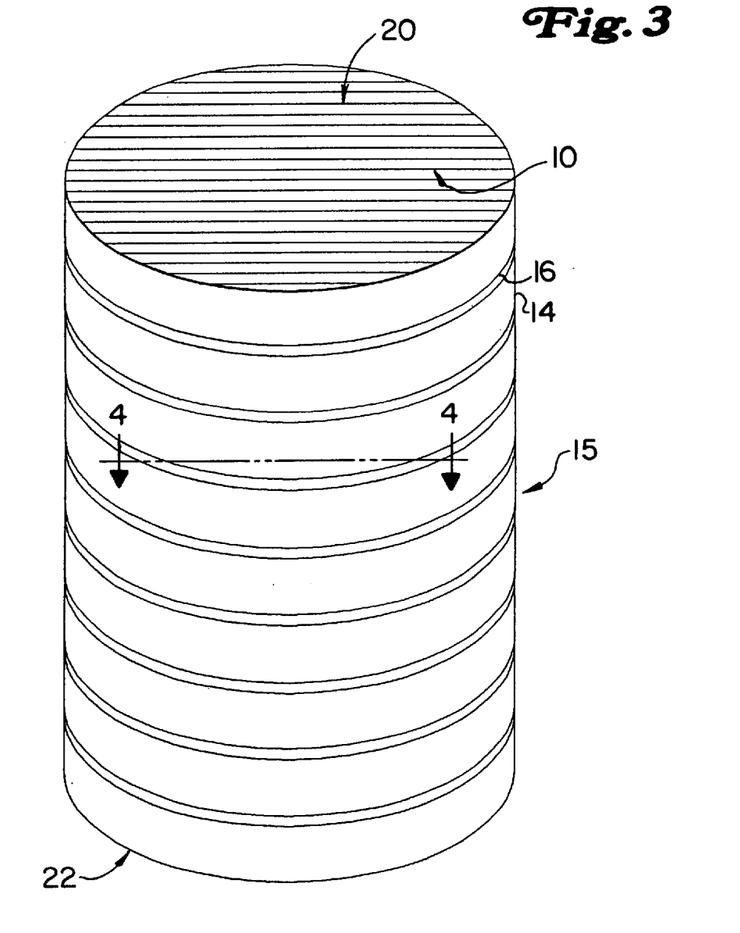
FIG. 3 is a perspective view of a packing plate assembly.

The corrugated plates are spaced adjacent to each other to form flow channels. Narrow corrugation height and spacing is preferred to maximize the wetable surface in the distillation section. The corrugation pattern is preferably reversed between adjacent plates in the reactor section to form flow channels and provide structural support to the plate sections. FIG. 3 shows an arrangement of multiple plates 10 stacked together and trimmed to provide a packing unit 15 having an outer circular circumference 14. The packing unit is in the form of a cartridge that is readily dropped into a distillation column to provide a complete section of distillation packing in one installation step. The ends of the adjacent plates that form circumference 14 are preferably welded to seal the ends of the channels and join the ends of the plates together. Regularly spaced bands 16 extend down the length of the packing unit 15 and provide additional structural support to the plates and can also be designed to prevent the bypass of fluid around the cartridge. The upper ends of plates 10 define a series of openings that collectively provide an outlet 20 for vapor rising from the packing. Vapor outlet 20 can also receive liquid as it descends through the distillation column. The bottom of plates 10 provides an outlet 22 for liquid that flows out of the packing. Outlet 22 also provides an inlet for vapors ascending through the distillation column.

Figure 4:
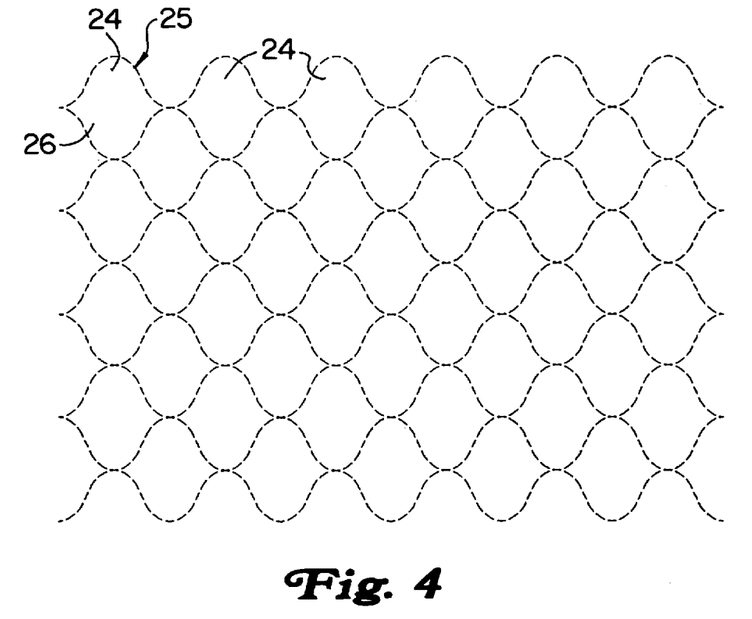
FIG. 4 is a horizontal cross-section of the plate packing taken in a central section of the packing plate assembly of FIG. 3 at section 4—4.

The bundling together of the plates provides continuous channels that extend vertically through the packing. A cross section 25 of packing, shown in FIG. 4 as a horizontal slice through a portion of the packing of FIG. 3, shows openings 24 for the vertically extended channels. The channels also extend diagonally across the packing in a single direction along a centerline 26 or in a herring bone configuration.

Figure 5:
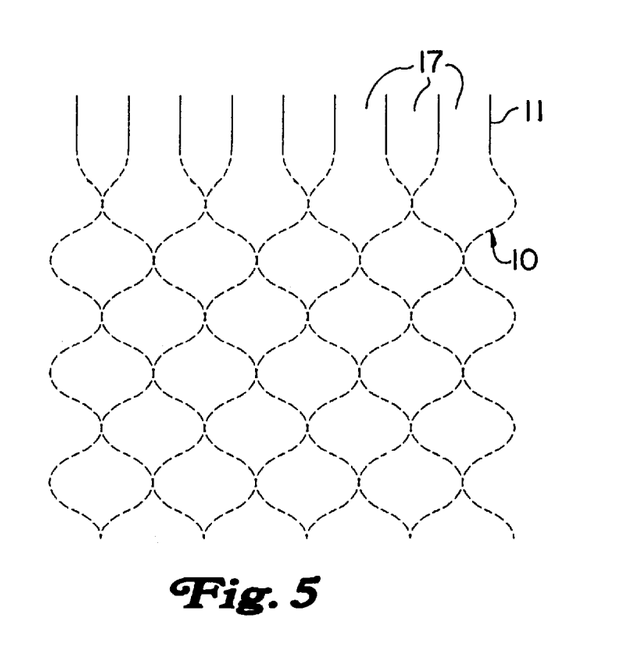
FIG. 5 is a vertical cross-section of a top portion of the plate packing.

FIG. 5 shows a vertical section of a portion of the packing of FIG. 3. This section is taken perpendicular to the plates and shows the smooth portion at the top of each plate. The smooth portion of edge 11 provides an inlet 17 having a regular configuration for loading catalyst into the channels. The catalyst loaded into the channels can be any particulate catalyst suitable for reactions that can utilize catalytic distillation. Such reactions include the production of oxygenates such as MTBE, ETBE, TME, production of aromatics such as ethylbenzene and cumene and other hydrocarbon reactions such as isomerization, hydrogenation, as well as non-hydrocarbon reactions. A wide variety of catalysts can be used for these reactions and include any particulate catalyst having dimensions and flow properties that will permit its passage through the continuous channels of this invention. Preferred particles will have a spheroidal shape and diameters of from about 1/16" to about 1/8". However, particles may have diameters of 1/4" or larger. Suitable materials for the catalyst particles include resins and refractory inorganic materials.

In accordance with this invention, the channels within a single packing section may be loaded with catalyst or catalysts in a variety of ways. Catalysts may be loaded in all of the channels throughout the packing or in any alternating arrangement of open and catalyst-filled channels. Catalyst may also be short loaded into a packing section in order to provide a section of pure distillation above a catalytic distillation section within the same continuous section of packing. The alternating channel configuration of catalyst loaded channels and catalyst free channels may include two or more loaded or unloaded channels for each channel that contains catalyst or remains unloaded. It is also possible to load a lower portion of a single packing section with one catalyst and an upper portion of a single packing section with another catalyst. Where all of the channels in a single section of packing are filled with one catalyst in a lower section and a different catalyst in the upper section, it may be advantageous to provide perforations in the plates that are large enough to permit migration of catalyst particles through the plates in order to achieve an even, vertical loading of catalyst over the entire interface between the two catalyst layers.

Figure 6:
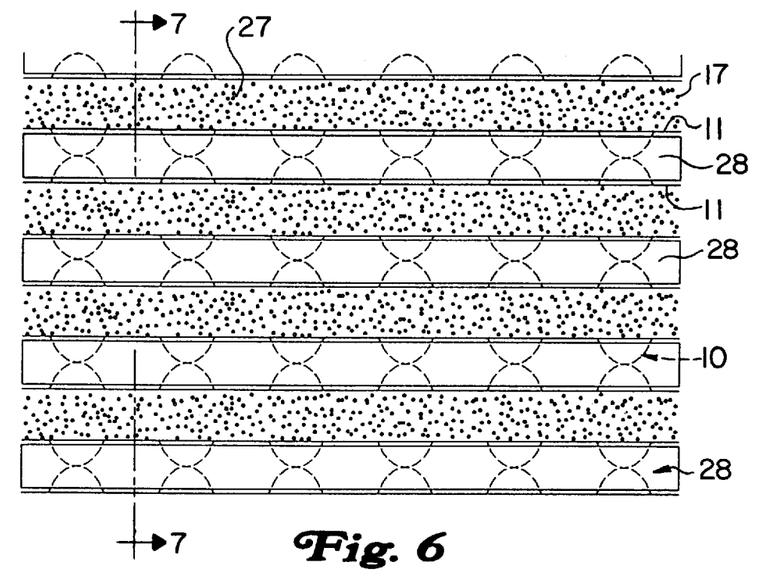
FIG. 6 is a plan view looking downward at the top of a portion of the packing containing catalyst.

Selective loadings of catalyst into channels can be facilitated by blocking the inlet to the channels that are to remain free of catalysts. The regular shaped inlets 17 at the top of the corrugated plates as shown in FIG. 5 can be used advantageously in the selective loading of catalyst. FIG. 6 shows alternate channels loaded with catalyst 27. As also shown in FIG. 6, the openings between plates 10 at the top of a channel that are to remain free of catalyst can be blocked with a plate assembly 28. The uniform sides provided by the smooth portion of edge 11 facilitates the closing of the channel inlet with simple plate assembly. Plate section 28 preferably has perforations to permit vapor or liquid to pass freely into the open channels.

Figure 7:
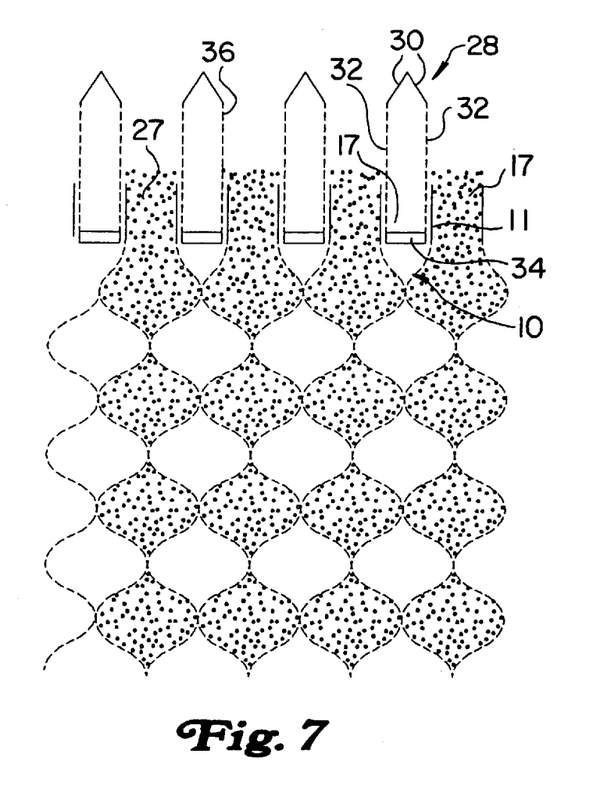
FIG. 7 is a vertical cross-section of the packing portion shown in FIG. 6.

FIG. 7 is a vertical cross section of the top of FIG. 6 and shows a structure for plate assembly 28 that permits vapor transfer while blocking open channels from receiving catalyst. Plate assembly 28 has an arrangement that maximizes vapor entry into the open channels and facilitates catalyst loading. Vertical, perforated plates 32 extend from the bottom of each peaked plate 30 and to the bottom of the smooth portion of edges 11. Contact with the curved portion of corrugated plates 10 retain plate assembly 28 in place. Spacers 34 installed at regular intervals over the length of plate assembly 28 maintain the width of the opening at the bottom of plates 32. The spacer arrangement 34 leaves essentially the entire bottom of plate assembly 28 open to vapor and liquid flow. The height of plates 32 may be adjusted as desired to provide the desired height of perforations 36 above the top level of catalyst 27. Plate assembly 28 need not be continuous over the entire length of inlet 17. Discreet sections of plate assembly 28 may be placed next to each other over the entire length of the channel defined by each inlet 17 to facilitate the installation of the inlet structure and distribution of the descending liquid. Minor amounts of catalyst leakage through any blocked portion of inlet 17 will pass through the bottom of the channel and will not interfere with the desired operation of alternate catalyst-filled and catalyst-empty channels. Once the desired inlets 17 are blocked, the catalytic distillation section may be filled by pouring catalyst over the entire vapor outlet end of the packing assembly until all of the desired channels are filled or the catalyst maintains a selected level within or above the packing channels.

Figure 8:
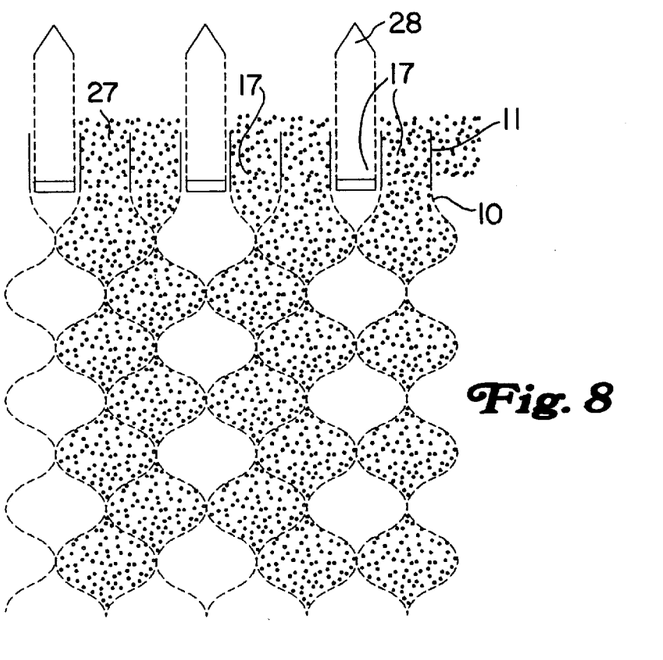
FIG. 8 is a vertical cross-section similar to FIG. 7 showing an alternate catalyst loading arrangement.

As mentioned previously, this invention can be practiced with any arrangement of filled and open channels. FIG. 8 shows a vertical section of an arrangement where two channels are filled with catalyst between each empty channel. It is a relatively easy operation with the packing of this invention to convert a catalyst arrangement in the packing as shown in FIG. 7 to that of FIG. 8. One needs only to dump the catalyst from the packing material by allowing it to flow out of the bottom of the channels, reconfigure the inlet blocking bars to that shown in FIG. 8, and then add catalyst to the top of the packing material until it again reaches the top of plate assembly 28.

Figure 9:
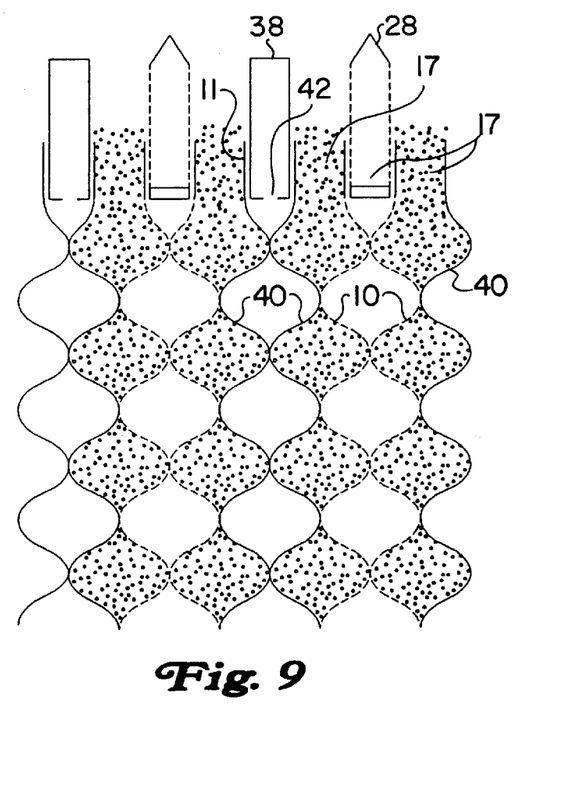
FIG. 9 is a vertical cross-section of the packing material loaded with catalyst and containing heat exchange channels.

The continuous channels of this invention are also able to provide indirect heat exchange within the packing material. As shown in FIG. 9, the packing arrangement consisting of corrugated plates 10 can include heat transfer manifolds 38. FIG. 9 shows a vertical elevation similar to FIG. 7 and 8. In this section, the packing arrangement consists of alternate pairs of the previously described, perforated corrugated plates 10 and solid corrugated plates 40 that do not contain perforations. The solid corrugated plates 40 provide continuous flow channels that are impermeable to both the fluid in the distillation column and the catalyst. Manifold 38 receives a heat transfer fluid that is distributed through openings 42 in the bottom of manifold 38. Manifold 38 is readily seal welded to edges 11 to provide sealed communication of the heat transfer fluid in the channels. A similar manifold arrangement at the bottom of the channels may be provided to collect the heat transfer fluid. Heat transfer manifolds may also or alternatively be provided at the sides of the corrugated plate sections in the flat portions of edges 11 that extend along the sides of the column as shown in FIG. 1. For an average 10' diameter distillation column packed with corrugations having a total depth of 1" there would be approximately 30 heat transfer manifolds required with a channel arrangement as shown in FIG. 9. Manifolds 38 permit heat transfer as well as catalyst change out within a catalytic distillation packing arrangement.

Figures 10, 11:
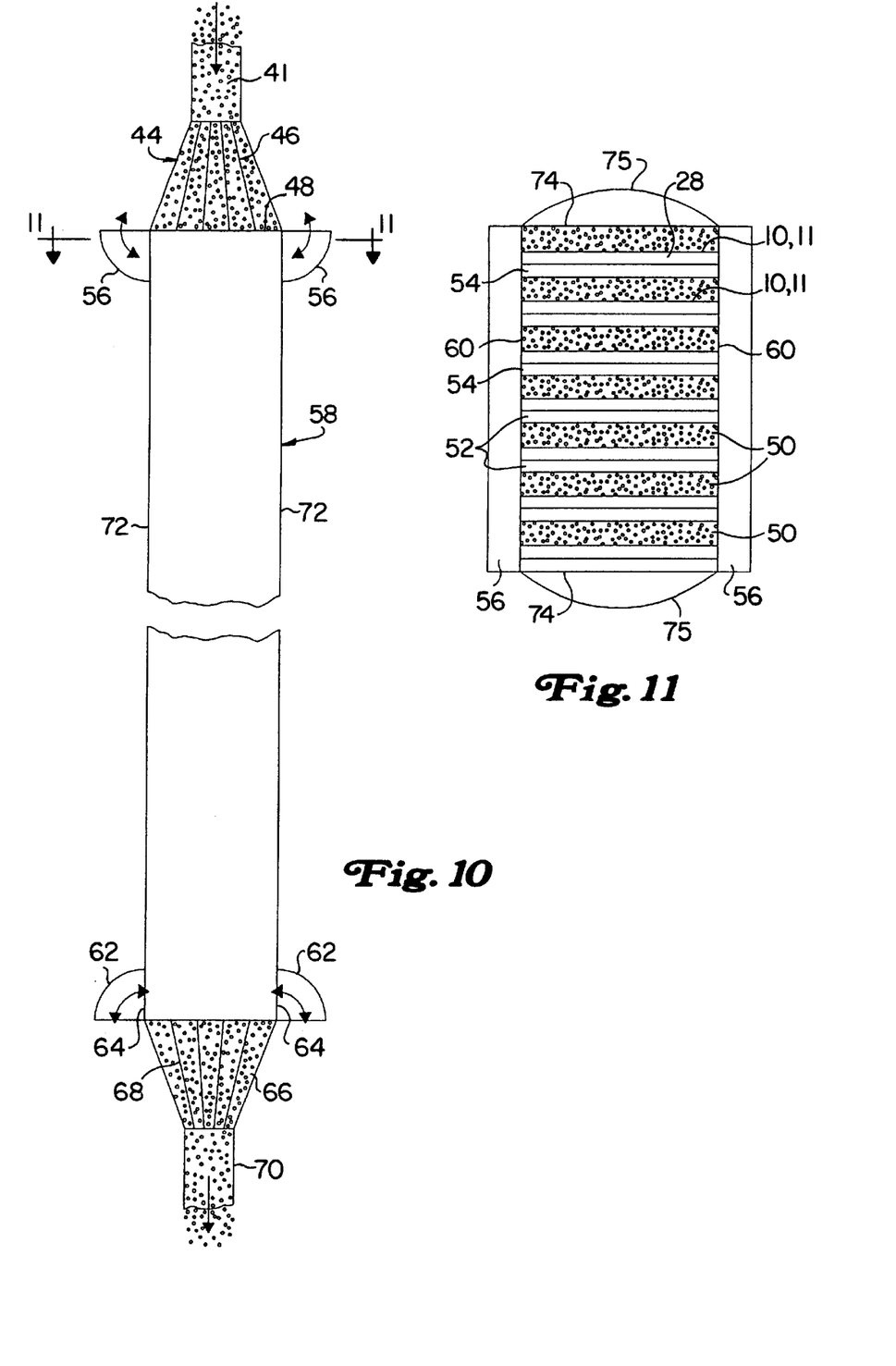
FIG. 10 is a vertical cross-section of a packing arrangement for providing continuous catalyst movement.
FIG. 11 is a horizontal cross-section of the packing arrangement of FIG. 10 taken at section 11—11.

In addition to adding heat transfer capability, the invention may also be arranged to provide continuous catalyst addition and withdrawal in a catalytic distillation zone. In the continuous catalyst addition and withdrawal arrangement of FIG. 10, fresh catalyst from a catalyst inlet 47 enters a catalyst distributor 44 having a series of vanes 46 to promote even distribution of catalyst across the entire outlet 48 of distributor 44. As shown by FIG. 11, a stack of parallel corrugated plates 10 having edges 11 define the channels 50 that are filled with catalyst in an alternate arrangement with channels 52 that are free of catalyst. The inlets to channels 52 are occupied by plate assembly 28 similar to that previously described which deflects catalyst into the catalyst-containing channels 50. The ends 54 of plate assembly 28 communicate on each side with manifolds 56 to permit a cross exchange of vapor out of the top of catalytic distillation section 58. The ends of catalyst-containing channels are closed to catalyst movement to prevent catalyst from entering manifold 56. Side 60 may be perforated to permit vapor and liquid exchange across the surface of the catalyst as well as plate assembly 28. At the bottom of catalytic distillation section 58 liquid and vapor are exchanged through a manifold 62 that communicates vapor and liquid across a catalyst impermeable surface 64. Liquid is withdrawn from and vapor can be introduced into distillation section 58 across surface 64. Catalyst is again withdrawn from the bottom of catalytic distillation section 58 by a collector 66 that contains vanes 68 for delivering a uniform flow of catalyst to an outlet 70.

Catalytic distillation section 58 may be located inside a larger distillation column or may be designed with side walls that provide pressure containment. Where the side walls of catalytic distillation section 58 provide pressure containment, the distillation section can operate without an external pressure vessel. Since catalytic distillation ordinarily operates at relatively low pressures, the normally welded side wall 72 of the catalytic distillation section 58 will be suitable for most applications. Whether operating internally or externally, side walls 74 that extend in a direction parallel to the channels will ordinarily have a similar corrugation pattern to the other plates within the packing. The only differences being the plates for side walls 74 will normally not have perforations whether the packing unit is located within a pressure vessel or acts as its own pressure containment device. Where the packing section acts as its own pressure containment vessel, side wall 74 may be modified to use a thicker plate material. Alternately, a curved plate may be welded to the side plate and the enclosed space can be pressurized with a fluid to provide pressure containment for the sides of the assembly. FIG. 11 shows a curved plate 75 for pressure containment on the ends of the packing arrangement. Where the distillation section 58 is located within a pressure vessel, distributor 44 and collector 66 may be made of perforated materials to permit vapor and liquid inflow and outflow.

Figure 12:
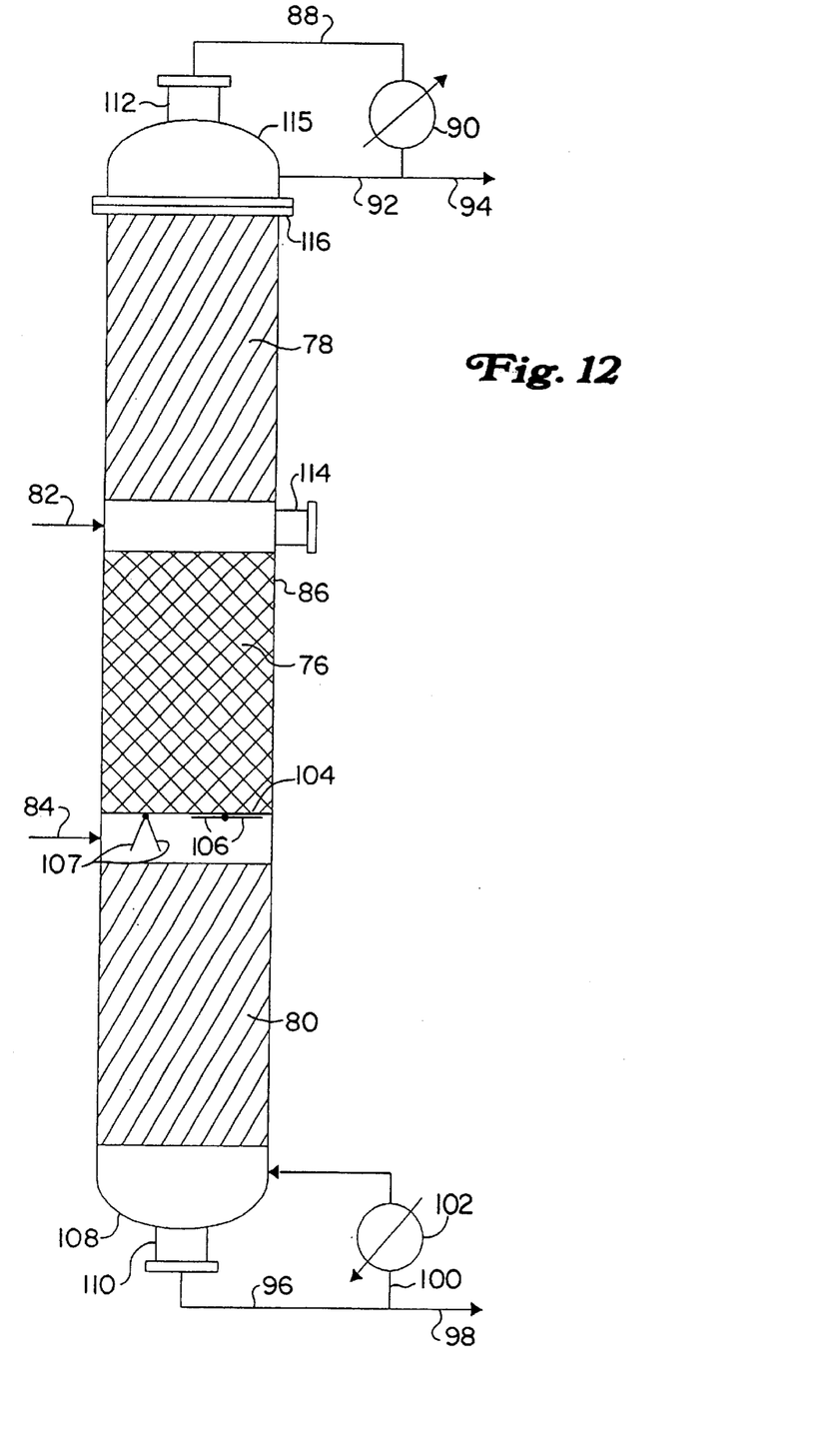
FIG. 12 is a vertical cross section schematically showing the inside of a distillation column using the packing of this invention.

In those embodiments of this invention that use an external pressure vessel to contain the distillation packing, additional distillation areas may be easily added by providing one or more sections of the same packing structure without catalyst within the catalytic distillation column. FIG. 12 shows an arrangement where a catalytic distillation section 76 is located between an upper distillation packing section 78 and a lower distillation packing section 80. Packing sections 78 and 80 are made of corrugated plates having perforations therein and continuous flow channels. The top head 115 of column 86 is joined to the remaining portion of the column by a flange 116. Packing section 78, catalytic distillation section 76, and packing section 80 may be lowered into the column by removing flange 116.

The use of packing sections having continuous channels above and below the catalytic distillation section will not interfere with catalyst loading or unloading. During normal operations, feed to the column may enter between sections of packing through lines 82 or 84. Separated vapor leaves distillation column 86 through an overhead line 88. After passing through a condenser 90, reflux liquid returns to the column via line 92 while the net column overhead leaves through a line 94. Liquid is recovered from the bottom of the column through a line 96, a net bottom stream is recovered via a line 98 while a recycle stream passes through a line 100 and are boiler 102 before returning to the column 86.

During operation the bottom 104 of catalytic distillation section 76 is occluded from catalyst flow by catalyst retaining baffles located in the bottom of catalytic distillation section 76. Baffles 106 are shown in a normal operating position extending parallel to the bottom 104 of catalytic distillation section 76. During normal operations, baffles 107 will be in the same positions as baffles 106 to block the entire bottom 104 from catalyst movement out of catalytic distillation section 76. The baffles are perforated to permit liquid outflow and vapor influx across the bottom 104.

The catalyst in catalytic distillation section 76 is readily replaced requiring only a short shutdown of the column. In order to replace the catalyst unloading baffles 106 are released and dropped to the postion shown for baffles 107 to initiate unloading of the catalyst. The baffles may be released by a suitable external mechanisms on the shell of column 86 or through an appropriate manway. Catalyst falls freely through the open channels of distillation section 80 and collects in the bottom head 108 of the column. Catalyst is removed from the column through the flange manway 110. After all the catalyst has emptied from the vessel through manway 110. Baffles 106 and 107 are returned to a closed position for retaining catalyst in distallation section 76. Fresh catalyst may be added through a manway 112. The catalyst passes downwardly through distillation section 78 and fills catalytic distillation section 76. Leveling of the catalyst bed surface on top of catalyst distillation section 76 can be done through sidewall manway 114.

What is claimed is:

1. A catalytic distillation column comprising:
   a structured packing comprising a plurality of corrugated plates having perforations defined therein and placed parallel to each other;
   a vapor outlet defined by vapor openings in the top of said packing and a liquid outlet defined by liquid openings in the bottom of said packing;
   a plurality of channels defined by spaces between said corrugated plates and extending continuously from said vapor outlet to said liquid outlet, wherein said corrugated plates extend continuously over the height of said channels and at least a first portion of said channels are adapted to retain a particulate catalyst and a second portion of said channels are adapted for the flow of liquid and vapor; opposite ends of said corrugated plates defining said first portion of said channels being spaced apart to define catalyst inlets and catalyst outlets; and opposite ends of said corrugated plates defining said second portion of said channels being spaced apart to define said vapor openings adjacent to said catalyst inlets and said liquid openings adjacent to said catalyst outlets;
   means for selectively releasing and retaining catalyst at the bottom of said first portion of said channels for removal of the catalyst from the catalytic distillation column without the necessity of removing the packing from the column;
   means for adding catalyst to the top of said first portion of the channels;
   means for collecting vapor from said vapor outlet; and
   means for collecting liquid from said liquid outlet.

2. The distillation column of claim 1 wherein said channels have a height of at least one meter.

3. The distillation column of claim 1 wherein said channels have a height of at least five meters.

4. The distillation column of claim 1 wherein the second portion of said channels are closed to particulate catalyst entry at the top and all of said channels are open at the bottom.

5. The distillation column of claim 1 wherein said packing is surrounded by a pressure vessel.

6. The distillation column of claim 1 wherein said corrugated plates have a thickness of at least 0.8 mm.

7. The distillation column of claim 1 wherein at least the top of said plates have a flat portion that defines a channel inlet having flat sides.

8. The distillation column of claim 7 wherein a portion of said channel inlets of said second portion of channels have an inlet restrictor that is fluid permeable and catalyst impermeable.

9. The distillation column of claim 1 wherein a manifold communicates with a third portion of said channels to deliver a heat transfer fluid to said third portion of said channels and a collector communicates with said third portion of said channels to collect said heat transfer fluid from said third portion of said channels.

10. The distillation column of claim 1 wherein pairs of fluid impermeable corrugated plates are located between said corrugated plates having said perforation to define heat exchange channels having heat exchange inlets, a manifold communicates with said heat exchange channels to deliver a heat transfer fluid to said heat exchange channels and a collector communicates with said heat exchange channels to collect said heat transfer fluid from said heat exchange channels.

11. The distillation column of claim 1 wherein said first portion of said channels are adapted to retain a catalyst having a smaller diameter than said perforations.

12. The distillation column of claim 1 wherein said plates are continuous and the pitch angle of said corrugations varies over the length of each plate.

13. A catalytic distillation column comprising:

a first packing section comprising a plurality of corrugated plates having perforations defined therein and placed parallel to each other;

a first vapor outlet defined by vapor openings in the top of said first packing section and a first liquid outlet defined by liquid openings in the bottom of said first packing section;

a first plurality of channels defined by the spaces between said corrugated plates in said first packing section and extending continuously from said first vapor outlet to said first liquid outlet, wherein said corrugated plates extend continuously over the height of the first plurality of channels, said first plurality of channels including catalyst channels and flow channels, opposite ends of said corrugated plates defining said catalyst channels being spaced apart to define catalyst inlets and catalyst outlets and opposite ends of said corrugated plates defining said flow channels being spaced apart to define said vapor openings adjacent to said catalyst inlets and said liquid openings adjacent to said catalyst outlets;

means for selectively retaining and releasing catalyst at the bottom of said catalyst channels for removal of the catalyst from the catalytic distillation column without the necessity of removing the first packing section from the column;

means for adding catalyst to the top of the catalyst channels;

means for collecting vapor from said first vapor outlet;

a second packing section located above or below said first packing section comprising a plurality of corrugated plates having perforations defined therein and placed parallel to each other;

a second vapor outlet defined by the top of said second packing section and a second liquid outlet defined by the bottom of said second packing section;

a second plurality of channels defined by the spaces between said corrugated plates in said second packing section and extending continuously from said second vapor outlet to said second liquid outlet, wherein said corrugated plates in said second packing section extend continuously over the height of the second plurality of channels; and means for collecting liquid from said second liquid outlet.

14. The catalytic distillation column of claim 13 further comprising a third packing section located below or above said first packing section opposite to said second packing section wherein said third packing section comprises a plurality of corrugated plates having perforations defined therein and placed parallel to each other.

15. A structured packing comprising:

a plurality of corrugated plates having perforations defined therein and placed parallel to each other;

a vapor outlet defined by the top of said packing and a liquid outlet defined by the bottom of said packing;

a plurality of channels defined by the spaces between said corrugated plates and extending continuously from said vapor outlet to said liquid outlet, wherein said corrugated plates extend continuously over the height of said channels;

a particulate catalyst material located inside a first portion of said channels; and a catalyst impermeable member located at the top of a second portion of said channels for occluding the opening to said second portion of said channels and preventing particulate catalyst entry therein, said catalyst impermeable member including at least one perforation therein for allowing fluid to flow therethrough, and a substantial absence of particulate catalyst material in said second portion of said channels.

16. The packing arrangement of claim 15 wherein the top of said corrugated plates have a flat portion that defines a channel inlet having flat sides and said catalyst permeable member has fluid permeable sidewalls that extend above said inlet.

* * * * *